C. G. COLLINS.
PROCESS OF EXTRACTING METAL FROM ORE.
APPLICATION FILED SEPT. 28, 1908.

919,129.

Patented Apr. 20, 1909.
2 SHEETS—SHEET 1.

Witnesses:
D. W. Gardner.
B. Berg.

Inventor:
Caleb G. Collins
By his Attorney
Leo. W. Rath

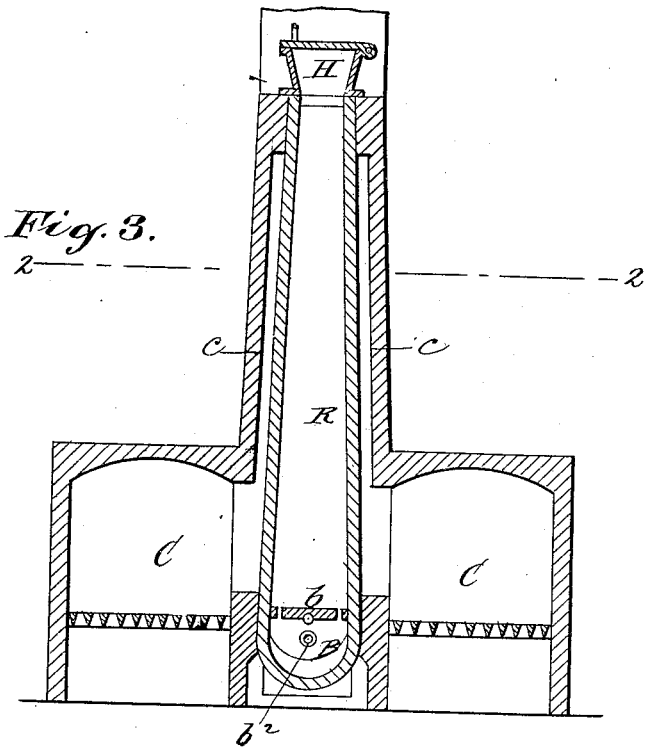
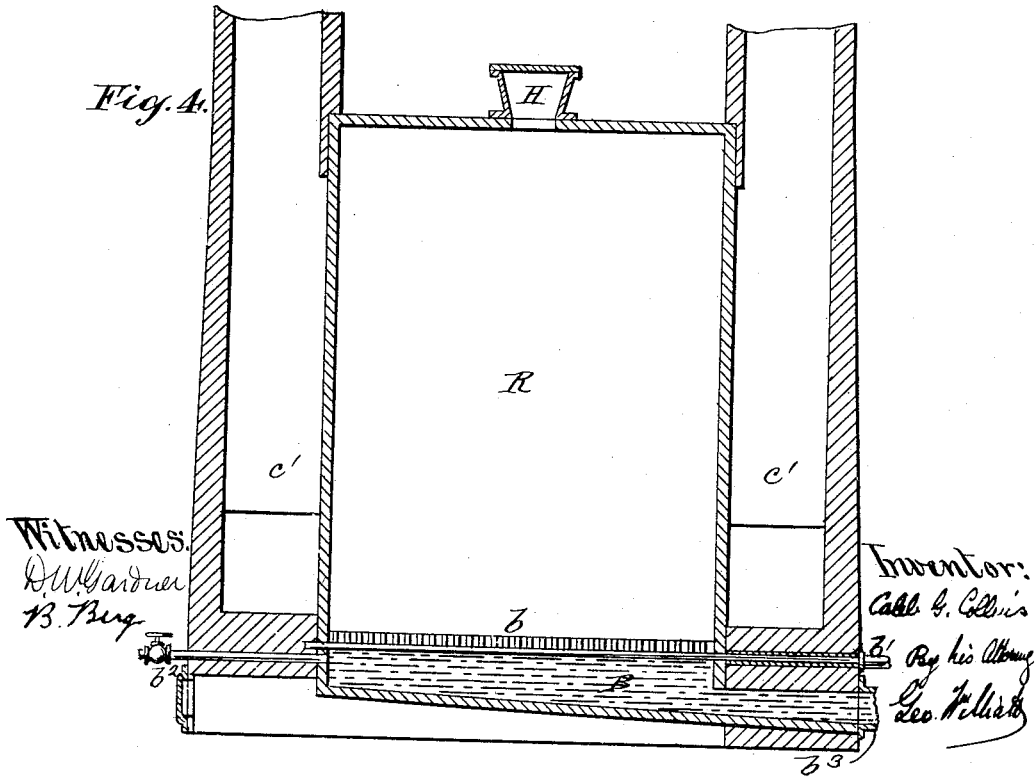

UNITED STATES PATENT OFFICE.

CALEB G. COLLINS, OF WOODMERE, NEW YORK, ASSIGNOR TO C. AMORY STEVENS, OF NEW YORK, N. Y.

PROCESS OF EXTRACTING METAL FROM ORE.

No. 919,129.     Specification of Letters Patent.     Patented April 20, 1909.

Application filed September 28, 1908. Serial No. 455,087.

*To all whom it may concern:*

Be it known that I, CALEB G. COLLINS, a citizen of the United States, residing at Woodmere, Nassau county, and State of New York, have invented certain new and useful Improvements in Processes of Extracting Metal from Ore, of which the following is a specification.

My invention relates to the treatment of ores for the extraction of metal, and affords an economical process by means of which practically all the metal is segregated and collected.

I am aware that heretofore comminuted carbonaceous material has been used in a closed furnace to reduce the oxids of metal to a metallic state, but I have found from practical investigation and experimentation that carbon alone is sufficient to effect the reduction of metals in various ores, so that only imperfect results have heretofore been attained in this respect.

My invention consists essentially in the use of the alkalies and alkaline earths in conjunction with carbonaceous material in the reduction of ores; and incidentally also includes certain other features hereinafter described and claimed.

Figure 1:
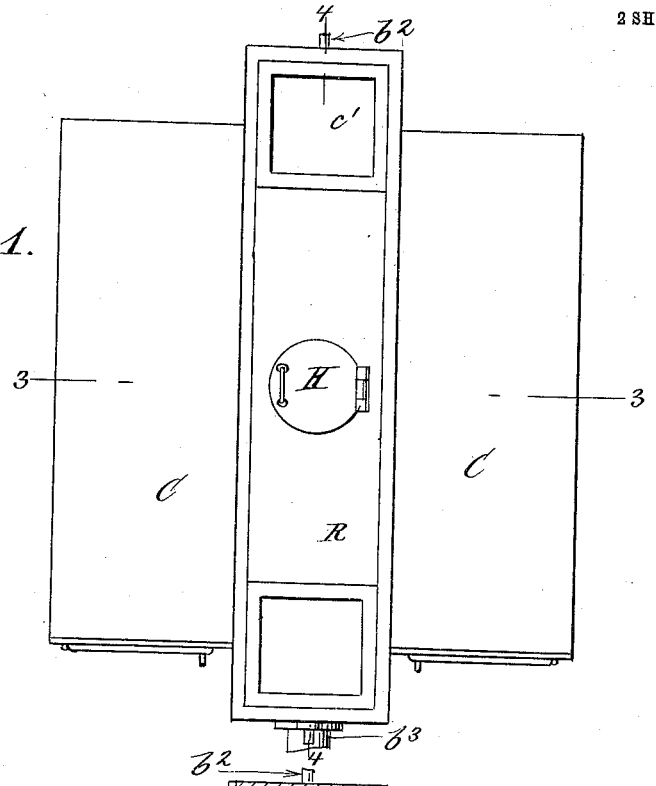
Figure 2:
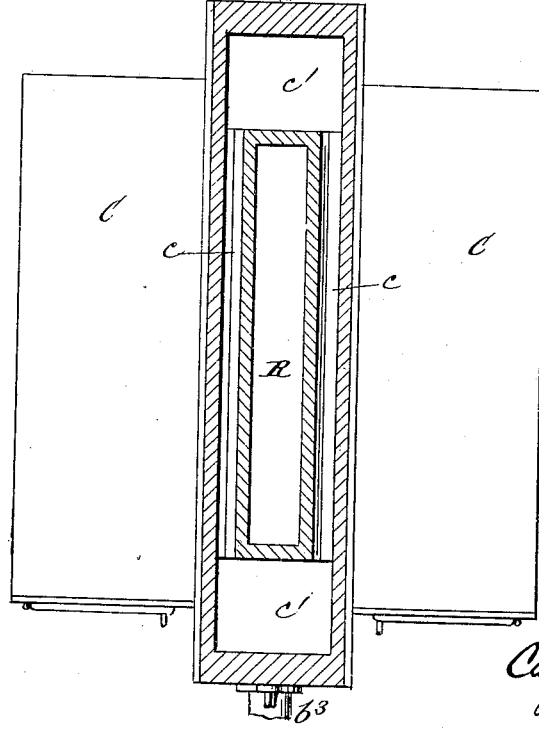

In the accompanying drawings, Figure 1, is a top view of a furnace adapted to the requirements of my improved process of reducing ores; Fig. 2, is a horizontal section thereof, taken upon plane of line 2—2— Fig. 3; Fig. 3, a vertical section taken upon plane of line 3—3— Fig. 1; Fig. 4, a vertical section taken upon plane of line 4—4— Fig. 1.

It is to be understood that I do not restrict myself to any special form or construction of furnace, that shown being simply for the purpose of illustrating a means of carrying out my improved process, and being the same as that shown and described in my concurrent application for patent, Serial No. 404,189, filed November 27th, 1907.

R, represents an elongated vertical retort chamber terminating in a water basin B below from which it is separated by a movable bottom $b$, which may be rocked from the exterior by means of a bar $b'$, (see Fig. 4). The upper portion of the retort R is provided with a hopper H capable of being sealed. Combustion chambers C, C, are located on each side of the retort chamber R, the products of combustion passing therefrom into the vertical side flues $c$, $c$, which in turn open into the end or chimney flues $c'$, $c'$. It will be seen that the side flues $c$, $c$, and the end flues $c'$, $c'$, constitute practically a single chamber surrounding the greater portion of the retort R, so that the latter may be subjected to a relatively high uniform temperature throughout. The basin B is supplied with water (preferably a slowly running stream) by a pipe $b^2$, or other suitable means; and its bottom is inclined downward toward an outlet $b^3$, communicating with any suitable receptacle. The ore with the other admixed constituents forming the charge to be treated is fed into the retort R by gravity or otherwise; care being taken that the hopper H is well filled to exclude air.

In practice I grind the ore to be treated to the degree of fineness desired, according to its hardness. With the comminuted ore I put ground charcoal, coal or other carbonaceous material; also comminuted carbonates of the alkalies or alkaline earths. After the retort is filled with the charge it is sealed to exclude the air and prevent the re-oxidation of the metal after it is segregated from the other constituents of the ore. The water seal afforded by the basin B, protects the lower end of the retort, and by receiving and cooling the metal as it descends from the retort preserves it for collection by any well known or desired process of concentration. The proportions of comminuted carbonaceous material, and of pulverized lime (either quick or slaked) or other carbonates of the alkalies or alkaline earths are varied with relation to the character and requirements of the particular ore to be treated, and are mixed intimately with the ground ore before the charge is introduced into the retort. After the retort is charged and sealed, fires are built in the combustion chambers C, C, the heat only being continued until the ore in the retort is brought to a bright red state of incandescence. The bottom $b$, is then rocked and tilted to allow of the descent of the segregated metal into the water in the basin B, where it is cooled and from which it is collected for concentration as before stated. The metal is thus removed from the retort from time to time as may be found most expedient. When the metal descends into the basin B, it causes the formation of steam which rises into the retort, where it is united with the calcium oxid and results in the generation of internal heat which materially aids in the reduction of the ore and effects a saving of fuel. In other words the reduced metal and the gangue, both red hot, as they drop from the furnace into the water under the furnace, generate steam which, coming in contact with the red hot carbon mixed with the ore, is decomposed into hydrogen and an exactly equal volume of carbon monoxid gas, both of which are when heated powerful reducing agents; or the same results may be attained by adding a suitable amount of moisture to the admixture before the charge is introduced into the retort.

I have demonstrated that alkalies and alkaline earths other than lime, such as barium hydrate and carbonate, and potassium and sodium hydrates and carbonates, may be effectually used in connection with carbon in the manner described when lime is the alkali used in the admixture to reduce the various ores as above set forth, hence although lime is ordinarily preferable on account of its relative cheapness, I do not restrict myself thereto, as other alkalies or alkaline earths may be substituted in whole or in part as may be found most expedient in the treatment of the particular ores.

When the carbonates of barium, potassium or sodium are used with the carbonate of calcium the reduction of the ore to the metallic state, especially if the ore be silicious, is effected at a lower temperature than when the only alkali used is carbonate of lime, but as before indicated there are some ores in which carbonate of calcium alone is the only alkali necessary.

Where powdered lime stone is used on the charge as before stated it is reduced to quicklime during the roasting process so that the steam evolved during the operation of dumping a portion of the charge into the water in the basin B, slakes the lime and thereby contributes materially to the degree of the heat in the sealed retort. In this connection it is to be noted that I am the first to utilize the heat of the reduced ore to form steam which is decomposed within the retort to afford hydrogen, which, being in a nascent state, is the most effective in producing the desired chemical reactions within the retort.

By the use, in combination with carbon and carbonates, of the alkalies and alkaline earths, I obtain powerful bases having a stronger affinity for the other elements in the ore than for the metal itself, and hence am enabled to extract practically all the metal in an economical manner.

By the action of the heat carbon monoxid, hydrogen, and contact of incandescent carbon, the oxids, hydrates and carbonates of the alkali metals are reduced to metallic sodium and potassium, which rising in vapor in metallic state penetrates every part of the mixture in the retort and removes the sulfur, tellurium, selenium and arsenic from the ore, while the carbon monoxid and hydrogen gases also present remove the oxygen from the metals in the ore as well as from any potash or sodium which may have been included in the mixture.

The caustic lime produced from the carbonates of lime in the mixture being a more powerful alkali than the potash or soda present takes the sulfur, selenium, tellurium and arsenic from the potassium or sodium compounds of these elements formerly combined with the metals in the ores, thus in the end producing calcium compounds of said elements and leaving potassium and sodium again free to act as carriers of the sulfur, arsenic &c., from the ores of the metals to the caustic lime, the lime itself being so infusible that it requires an intermediary like potassium or sodium to act as a carrier of sulfur and other elements from the ore to the lime.

What I claim as my invention and desire to secure by Letters Patent is,

1. The herein described process of separating metal from ore which consists in mixing the ore in a comminuted state with comminuted carbonaceous material, and with comminuted carbonates of the alkalies or the alkaline earths, and subjecting the mixture to heat in a closed retort.

2. The herein described process of separating metal from ore which consists in mixing the ore in a comminuted state with comminuted carbonaceous material, and with comminuted carbonates of the alkalies or the alkaline earths, subjecting the mixture to heat in a closed retort, and discharging the resultant metal into water, for the purpose described.

3. The herein described process of separating metal from ore which consists in mixing the ore in a comminuted state with comminuted carbonaceous material, and with comminuted lime, and subjecting the mixture to heat in a closed retort.

4. The herein described process of separating metal from ore which consists in mixing the ore in a comminuted state with comminuted carbonaceous material, and with comminuted lime, subjecting the mixture to heat in a closed retort, and discharging the resultant metal into water, for the purpose described.

5. The herein described process of separating metal from ore consisting in mixing the ore in a comminuted state with comminuted carbonaceous material and comminuted lime stone, subjecting the mixture to heat in a closed retort in the presence of moisture to slake the quicklime resulting from the heating of the lime stone, for the purpose described.

6. The herein described process of separating metal from ore consisting in mixing the ore in a comminuted state with comminuted carbonaceous material and comminuted lime stone, subjecting the mixture to heat in a closed retort, and admitting steam to the retort to slake the quicklime resulting from the heating of the lime stone, for the purpose described.

7. The herein described process of separating metal from ore consisting in mixing the ore in a comminuted state with comminuted carbonaceous material and with comminuted carbonates of the alkalies or the alkaline earths, subjecting the mixture to heat in a closed vessel, discharging the resultant metal into water, and utilizing the steam thereby generated to form hydrogen within the retort for the purpose described.

8. The herein described process of separating metal from ore consisting in mixing the ore in a comminuted state with comminuted carbonaceous material and with a base having an affinity stronger than that of the metal for the other elements in the ore, and then subjecting the mixture to heat in a closed retort.

CALEB G. COLLINS.

Witnesses:
H. C. HUMPHREY,
R. L. WILLIS.